US012574729B2

(12) United States Patent
Stammers et al.

(10) Patent No.: US 12,574,729 B2
(45) Date of Patent: Mar. 10, 2026

(54) ENTERPRISE CERTIFICATE DELIVERY FOR PRIVATE 5G NETWORK AUTHENTICATION

(71) Applicant: Cisco Technology, Inc., San Jose, CA (US)

(72) Inventors: Timothy Peter Stammers, Raleigh, NC (US); Bhavik Yogeshkumar Adhvaryu, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 271 days.

(21) Appl. No.: 18/315,934

(22) Filed: May 11, 2023

(65) Prior Publication Data

US 2024/0381086 A1 Nov. 14, 2024

(51) Int. Cl.
| | |
|---|---|
| *H04L 29/06* | (2006.01) |
| *H04L 9/40* | (2022.01) |
| *H04W 12/069* | (2021.01) |
| *H04W 12/08* | (2021.01) |
| *H04W 12/30* | (2021.01) |

(52) U.S. Cl.
CPC ........... *H04W 12/069* (2021.01); *H04L 63/20* (2013.01); *H04W 12/08* (2013.01); *H04W 12/35* (2021.01)

(58) Field of Classification Search
CPC ... H04W 12/069; H04W 12/08; H04W 12/35; H04W 12/06; H04L 63/20; H04L 63/0823
See application file for complete search history.

(56) References Cited

U.S. PATENT DOCUMENTS

| | | | |
|---|---|---|---|
| 11,582,601 B2 | 2/2023 | Ganesan et al. | |
| 2010/0088519 A1* | 4/2010 | Tsuruoka | H04L 9/3273 |
| | | | 713/176 |
| 2016/0087972 A1 | 3/2016 | Ahmavaara et al. | |
| 2016/0226877 A1* | 8/2016 | Haggerty | H04W 8/183 |
| 2021/0058391 A1* | 2/2021 | Graybeal | H04W 12/086 |
| 2021/0103461 A1* | 4/2021 | Esibov | G06F 21/32 |
| 2021/0306854 A1 | 9/2021 | Gundavelli et al. | |
| 2022/0060893 A1 | 2/2022 | Gundavelli et al. | |

(Continued)

FOREIGN PATENT DOCUMENTS

| | | | | |
|---|---|---|---|---|
| EP | 3713274 A1 | 9/2020 | | |
| WO | WO-2021118914 A1 * | 6/2021 | ......... | H04L 61/3075 |

OTHER PUBLICATIONS

"5G; Security architecture and procedures for 5G System (3GPP TS 33.501 version 17.9.0 Release 17)," 3GPP 5G, ETSI TS 133 501, V17.9.0, Apr. 2023, 297 pages.

(Continued)

*Primary Examiner* — Shawnchoy Rahman

(74) *Attorney, Agent, or Firm* — Edell, Shapiro & Finnan, LLC

(57) ABSTRACT

Presented herein are efficient techniques through which an enterprise certificate is obtained for a user device based on a Subscriber Identity Module (SIM)-based authentication of the user device. A request for a SIM-based authentication is received from a user device accessing a private cellular network. A certificate is obtained from an enterprise based on the SIM-based authentication of the user device. The certificate is stored at the user device and used for subsequent authentication of the user device when accessing the private cellular network.

20 Claims, 7 Drawing Sheets

(56)  References Cited

U.S. PATENT DOCUMENTS

| | | | |
|---|---|---|---|
| 2022/0210722 A1 | 6/2022 | Saini et al. | |
| 2022/0408256 A1 | 12/2022 | Choyi et al. | |
| 2023/0134941 A1* | 5/2023 | Soryal | H04W 12/63 |
| | | | 726/2 |
| 2024/0365116 A1* | 10/2024 | Lake | H04W 12/35 |

OTHER PUBLICATIONS

"5G; System architecture for the 5G System (5GS) (3GPP TS 23.501 version 17.8.0 Release 17)," 3GPP 5G, ETSI TS 123 501, V17.8.0, Apr. 2023, 575 pages.

* cited by examiner

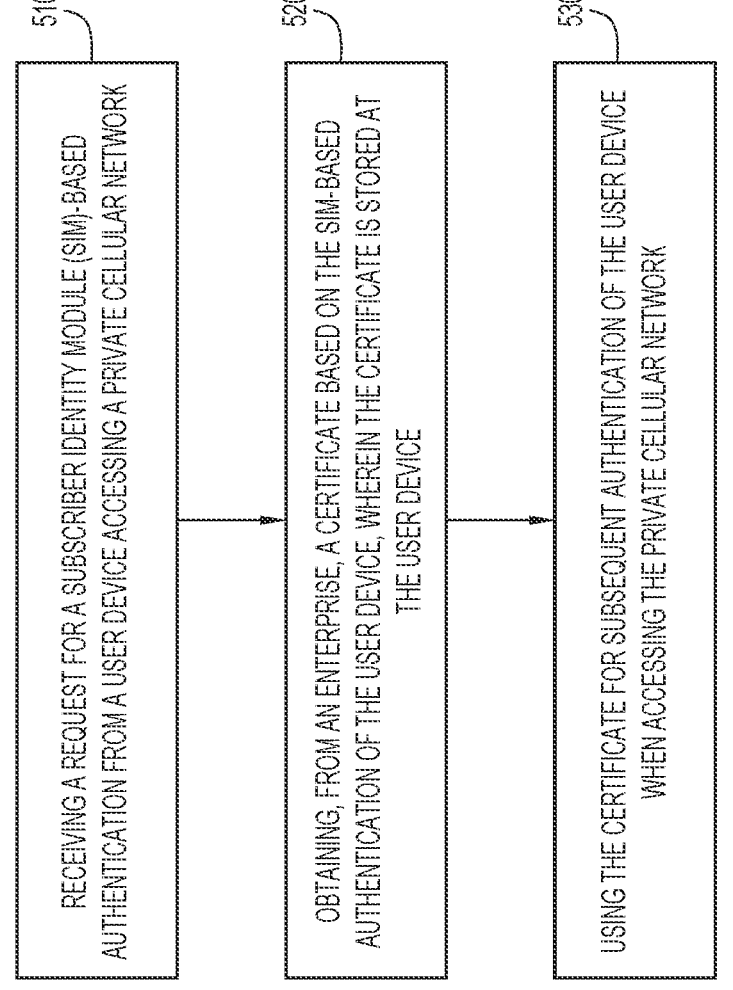

510

RECEIVING A REQUEST FOR A SUBSCRIBER IDENTITY MODULE (SIM)-BASED AUTHENTICATION FROM A USER DEVICE ACCESSING A PRIVATE CELLULAR NETWORK

520

OBTAINING, FROM AN ENTERPRISE, A CERTIFICATE BASED ON THE SIM-BASED AUTHENTICATION OF THE USER DEVICE, WHEREIN THE CERTIFICATE IS STORED AT THE USER DEVICE

530

USING THE CERTIFICATE FOR SUBSEQUENT AUTHENTICATION OF THE USER DEVICE WHEN ACCESSING THE PRIVATE CELLULAR NETWORK

ENTERPRISE CERTIFICATE DELIVERY FOR PRIVATE 5G NETWORK AUTHENTICATION

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of mobile users becomes more critical.

BRIEF DESCRIPTION OF THE DRAWINGS

FIG. 5 is a flow chart depicting a method associated with obtaining an enterprise certificate for a user device based on a SIM-based authentication of the user device, according to an example embodiment.

DESCRIPTION OF EMBODIMENTS

Overview

Figure 1:
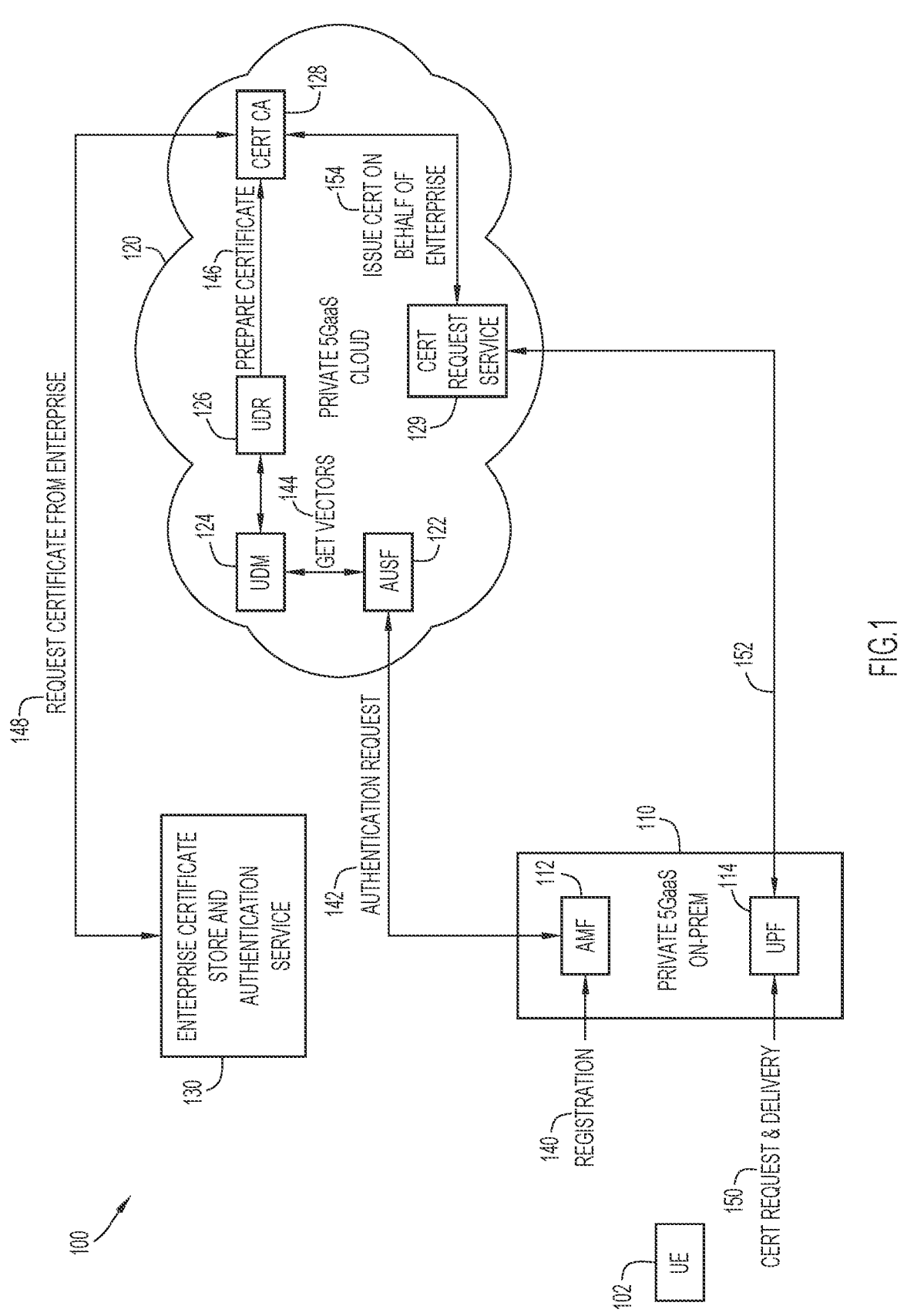
FIG. 1 is a diagram of a system in which techniques that facilitate obtaining an enterprise certificate for a user device based on a Subscriber Identity Module (SIM)-based authentication of the user device may be implemented, according to an example embodiment.

Historically, private Third Generation Partnership Project (3GPP) cellular networks have authenticated user devices/user equipment (UEs) using the UE's SIM credentials. These private 5G solutions are based on technology adopted from service provider's mobile networking using SIM-credentials for access and subscription authentication/authorization. On the other hand, enterprises primarily use certificate-based methods for authentication/authorization when using WiFi and cabled access. 3GPP Release 17 allows certificate-based authentication for private cellular networks. Some problems arise when allowing certificate-based authentication for private cellular networks. First, for a UE to use certificate-based authentication for accessing a private cellular network, the UE has to first obtain and provision an enterprise-trusted certificate. In addition, the private cellular network has visibility to the UE's SIM credentials only.

Presented herein are techniques through which a SIM-based access authentication is used to trigger delivery of an enterprise-owned certificate to a UE for future access authentication of the UE to a private cellular network. According to embodiments described herein, when the UE authenticates with the cellular network using SIM credentials, a certificate is obtained from an enterprise based on the SIM-based authentication. The certificate is stored at the UE and used for subsequent authentication of the UE with the private cellular network. The certificate retrieval and delivery to the UE may be automated as a result of a first time SIM-based authentication success of the UE. The certificate may be used as a primary credential for subsequent access authentications or as a fallback authentication mechanism if cloud connectivity fails.

According to embodiments described herein, an authentication policy is determined that outlines conditions describing when the UE is to use certificate-based authentication for authenticating with the private cellular network. For example, the authentication policy may indicate that the UE is to use the certificate for authentication and the authentication is enterprise-hosted when SIM-based authentication is not possible (e.g., when there is a connectivity failure with a cloud associated with the private cellular network and the cloud-hosted SIM-based authentication is not possible). As another example, the authentication policy may indicate that the UE is to use certificate-based authentication even when SIM-based authentication is possible. The authentication policy may additionally indicate whether the certificate-based authentication is enterprise-hosted or cloud-hosted and/or where the certificate is stored (e.g., at an enterprise or at a cloud).

According to embodiments described herein, the authentication policy may be transmitted to an on-premise (on-prem) portion of the private cellular network and subsequent authentication requests received at the on-prem portion are routed based on the authentication policy. For example, the subsequent authentication requests may be routed to the enterprise or to the cloud based on the authentication policy. Associated updates to the authentication method that is to be used and for the choice of primary and backup authentication "server" (e.g., enterprise-hosted or cloud-hosted) are applied to the network to satisfy the future authentication requests.

Referring to FIG. 1, FIG. 1 is a block diagram of a system 100 in which techniques that obtain a certificate from an enterprise based on a SIM-based authentication of a user device with a private cellular network may be implemented, according to an example embodiment. System 100 may include a UE 102, an On-Prem portion 110 of a Private 5GaaS network (sometimes referred to herein as on-prem 110), a Cloud portion 120 of the Private 5GaaS network (sometimes referred to herein as cloud 120), and an Enterprise Certificate Store and Authentication Service 130 (sometimes referred to herein as enterprise 130).

As illustrated in FIG. 1, on-prem 110 includes Access and Mobility Function (AMF) 112 and User Plane Function (UPF) 114. Typically, an AMF, such as AMF 112, provides access authentication services, authorization services, and mobility management control functions. UPF 114 may support features and capabilities to facilitate user plane operation, such as packet routing and forwarding, interconnection to a data network, policy enforcement, and data buffering for 5G network connectivity.

Cloud 120 includes Authentication Server Function (AUSF) 122, Unified Data Management function (UDM) 124, Unified Data Repository (UDR) 126, Certificate Authority (Cert CA) 128, and Certificate Request Service 129. Typically, an AUSF, such as AUSF 122 provides services for SIM-based authentication. UDM 124 may manage network user data in a single, centralized element and UDR 126 may store the user data. In some embodiments, UDM 124 and UDR 126 may be implemented in a single device denoted as UDM 124/UDR 126.

In various embodiments, UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IOT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of radio access networks.

In the example illustrated in FIG. 1. UE 102 transmits a request to authenticate with the 5GaaS network to access services provided by the 5GaaS network. At 140, UE 102 registers with the 5G core by sending a registration request to AMF 112. In this example, UE 102 is using a SIM-based access authentication and the registration request includes the subscription identifier associated with UE 102. AMF 112 is responsible for transmitting requests to the cloud 120 and, at 142, AMF 112 transmits an authentication request to AUSF 122 to authenticate UE 102. At 144, AUSF 122 sends a request to UDM 124 to obtain authentication vectors for authenticating UE 102 and UDM 124 sends a request to UDR 126 to obtain the vectors.

The SIM-based access authentication of UE 102 triggers a request to obtain an enterprise-owned certificate for future certificate-based access authentication of UE 102 with the 5GaaS network. At 146, based on receiving the request for the authentication vectors, UDR 126 transmits a message to Cert CA 128 to obtain an enterprise certificate for UE 102. At 148, Cert CA 128 requests the certificate from enterprise 130 so that UE 102 may authenticate to the enterprise network using the enterprise-owned network instead of using SIM credentials for subsequent authentication with the 5GaaS network. Enterprise 130 issues the certificate for UE 102 and provides the certificate for UE 102 to Cert CA 128 in cloud 120.

Cert CA 128 transmits a message to UDR 126 indicating that a certificate has been issued for UE 102. UDR 126 may store an indication that the certificate has been issued for UE 102 in the description data for UE 102. UDR 126 transmits the authentication vectors for authenticating UE 102 to AUSF 122 and AUSF 122 authenticates UE 102 for accessing the 5GaaS network. AUSF 122 transmits a message to AMF 112 indicating that UE 102 has been authenticated and AMF 112 forwards a message to UE 102 indicating that the authentication is successful.

When UE 102 has been successfully authenticated and a data session established, the certificate may be delivered through the data plane to UE 102 and stored at UE 102. At 150, UE 102 transmits a message to UPF 114 requesting the certificate and at 152, UPF 114 sends a request for the certificate for UE 102 to Certificate Request Service 129. At 154, Certificate Request Service 129 requests the certificate from Cert CA 128. Cert CA 28 forwards the certificate toward UE 102 via Certificate Request Service 129 and UPF 114. UE 102 stores the certificate. Once the certificate is stored at UE 102, UE 102 may use the certificate for subsequent authentication with the 5GaaS network. As discussed further with respect to FIGS. 3 and 4, UE 102 may use the certificate for subsequent authentication based on an authentication policy that details when a certificate-based authentication is to be performed (i.e., instead of a SIM credential-based authentication).

Figure 2:
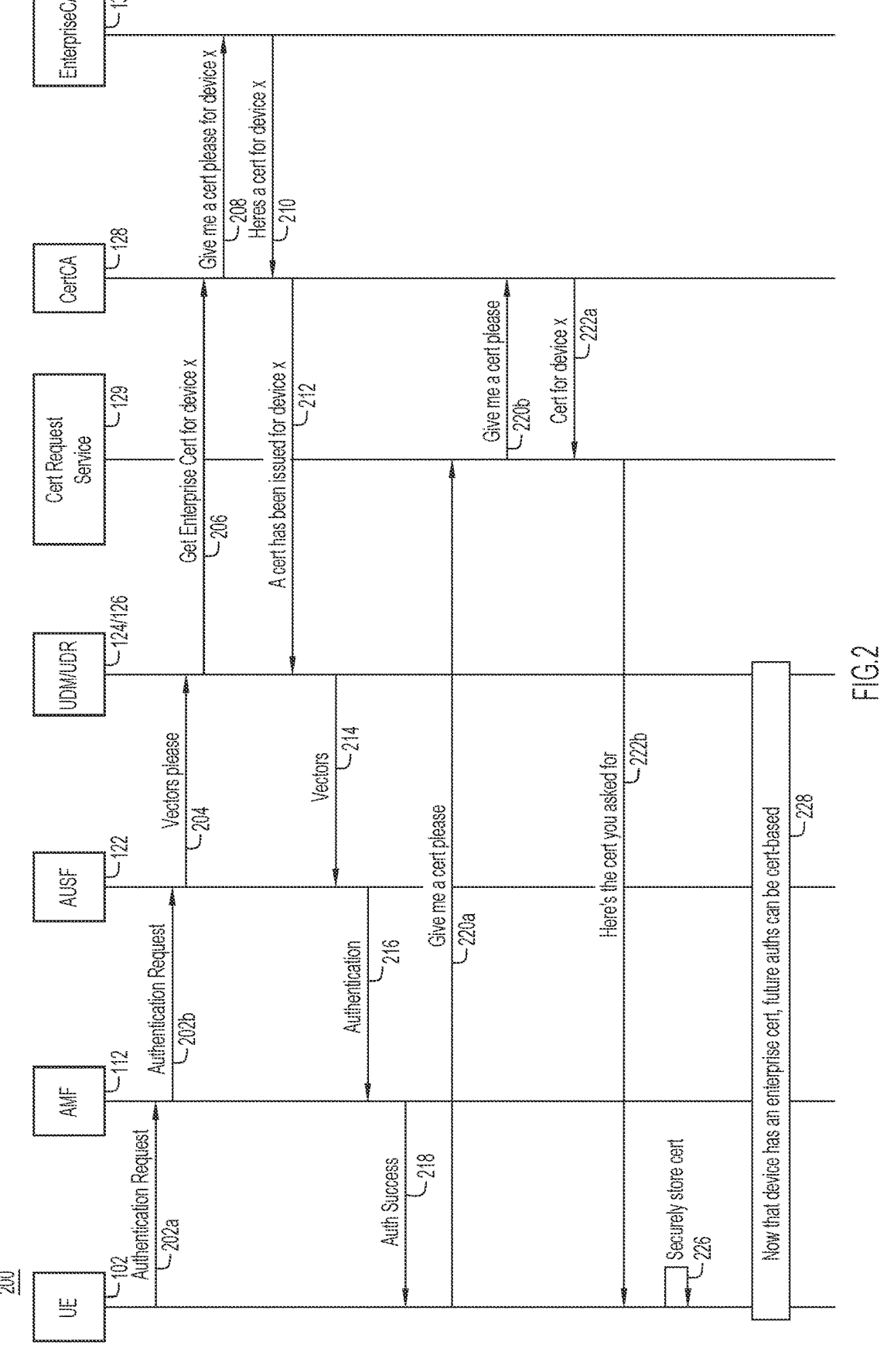
FIG. 2 is a message sequence diagram illustrating a call flow associated with obtaining an enterprise certificate for a user device based on a SIM-based authentication of the user device, according to an example embodiment.

Reference is now made to FIG. 2. FIG. 2 is a message sequence diagram illustrating a call flow 200 associated with obtaining an enterprise-owned certificate for a UE in response to receiving a SIM-based authentication request from the UE for accessing a private cellular network, according to an example embodiment. In the example embodiment, the certificate retrieval and delivery to UE 102 is triggered based on a first time SIM-based authentication success of UE 102.

At 202*a*. UE 102 transmits an authentication request to AMF 112 and at 202*b*, AMF 112 forwards the authentication request to AUSF 122. At 204, AUSF requests authentication vectors from UDM 124/UDR 126 for authenticating UE 102. In this example embodiment, UDM 124 and UDR 126 are illustrated as a single device. However, in other embodiments, UDM 124 and UDR 126 may be separate devices. As discussed with respect to FIG. 1, the vector request triggers UDM 124/UDR 126 to instruct Cert CA 128 to obtain an enterprise-owned certificate for UE 102 to enable UE 102 to use the certificate for authenticating with the 5GaaS network.

At 206, UDM 124/UDR 126 transmits a message to Cert CA 128 requesting that Cert CA 128 obtain a certificate from enterprise 130 for UE 102. At 208, Cert CA 128 requests the certificate from enterprise 130 and, at 210, enterprise 130 issues the certificate for UE 102 and transmits the certificate for UE 102 to Cert CA 128. At 212, Cert CA 128 transmits a message to UDM 124/UDR 126 indicating that a certificate has been obtained for UE 102 and the certificate will be delivered to UE 102. Although not illustrated in FIG. 2, UDM 124/UDR 126 may update a record associated with UE 102 to indicate that the certificate has been issued.

At 214, UDM 124/UDR 126 transmit the authentication vectors to AUSF 122 for the SIM-based authentication of UE 102. When AUSF 122 obtains the vectors, at 216, AUSF 122 transmits an authentication message to AMF 112 indicating that UE 102 has been authenticated and, at 218, AMF 112 transmits a message to UE 102 indicating that the authentication is successful.

Once the certificate has been obtained for UE 102 and the authentication of UE 102 is successful, UE 102 may obtain the certificate over the data plane and store the certificate for subsequent certificate-based authentication. At 220a, UE 102 sends a message to Certificate Request Service 129 requesting the certificate and, at 220b, Certificate Request Service 129 requests the certificate from Cert CA 128. At 222a, Cert CA 128 transmits the certificate to Certificate Request Service 129 and, at 222b, Certificate Request Service 129 forwards the certificate to UE 102. At 226, UE 102 securely stores the certificate. At 228, UE 102 may use the enterprise certificate for future or subsequent certificate-based authentication of UE 102 with the 5GaaS network, as described below with respect to FIGS. 3 and 4.

Figure 3:
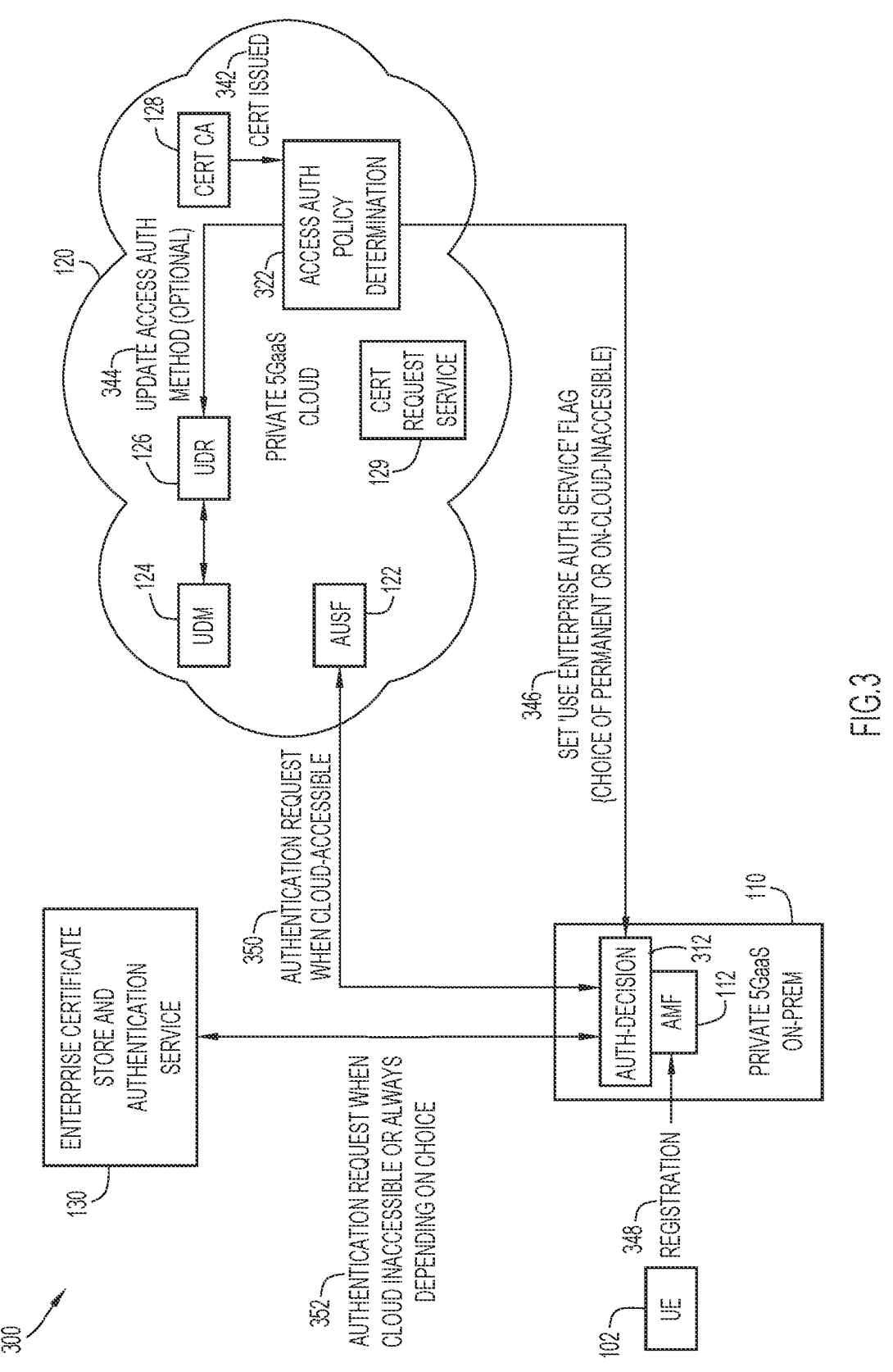
FIG. 3 is a diagram of a system in which techniques that facilitate updating authentication techniques based on obtaining an enterprise certificate for a user device may be implemented, according to an example embodiment.

Reference is now made to FIG. 3. FIG. 3 is a block diagram of a system 300 for updating the network provisioning state such that the delivered certificate is used for subsequent access authentication of UE 102 based on an authentication policy, according to embodiments described herein.

As discussed above in FIGS. 1 and 2, Cert CA 128 obtains an enterprise certificate issued by enterprise 130 for UE 102. The issuance of the certificate results in a trigger to an Access Authentication Policy Determination function 322 located in the cloud 120 indicating that a certificate valid for cellular access authentication has been issued for UE 102. As illustrated in FIG. 3, at 342, Cert CA 128 transmits a message to Access Authentication Policy Determination function 322 instructing Access Authentication Policy Determination function 322 to notify other functions in the 5GaaS network that certificate-based authentication is available for UE 102. Access Authentication Policy Determination function 322 may determine an authentication policy associated with the use of the certificate for authentication of UE 102. In other words, Access Authentication Policy Determination function 322 may set conditions for when certificate-based authentication is to be used for authenticating UE 102 with the 5GaaS network.

In one example, the authentication policy may indicate that the default authentication method is certificate-based and the authentication is cloud-hosted. In this example, it is assumed that the issued certificate is stored in the cloud 120 and that enterprise 130 has given permission for the delegated storage and management of the certificate as well as the use of the certificate for authentication. In another example, the authentication policy may indicate that the default authentication method is certificate-based and the certificate is held at enterprise 130. In these two examples, the delivered certificate is adopted for future access authentications even when SIM credential-based access authentication is possible.

In another example, the authentication policy may indicate that the certificate is to be used for subsequent authentication when SIM credential access authentication is not possible (e.g., when the cloud 120 is not reachable, when there is a cloud connectivity failure, etc.). In this example, when SIM-based authentication is not possible, the certificate-based authentication of UE 102 is enterprise-hosted. Other authentication policies may exist. For example, some authentication policies may indicate that certificate-based authentication is to be used during certain times of the day, when network traffic is at a certain level, etc.

In some embodiments, at 344, Access Authentication Policy Determination function 322 may send a message to UDR 126 indicating that use of the certificate for authentication is to be enabled when the authentication of UE 102 is cloud-hosted. Access Authentication Policy Determination function 322 may send this message to UDR 126 when the authentication policy indicates that certificate- and cloud-hosted authentication is enabled for at least part of the time.

At 346, Access Authentication Policy Determination function 322 sends a message to an Authentication Decision function 312 located at on-prem 110 indicating that the certificate can be used for authentication. Access Authentication Policy Determination function 322 additionally transmits the authentication policy to the Authentication Decision function 312. The Authentication Decision function 312 is responsible for routing authorization requests from UE 102 (e.g., to enterprise 130 or cloud 120) based on the authentication policy. The Authentication Decision function 312 has conditions set for when certificate-based authentication is used for authenticating UE 102 with the 5GaaS network. For example, based on the authentication policy, a "Use Enterprise Authentication Policy" flag may be set to "permanent" or "on-cloud-inaccessible." For example, if the authentication policy indicates that the default authentication method for UE 102 is certificate-based and enterprise-hosted, the flag may be set to "permanent." If the authentication policy indicates that the authentication method is certificate-based and enterprise-hosted when SIM- or certificate-based authentication via the cloud 120 is not possible, the flag may be set to "on-cloud-inaccessible."

When the conditions have been set at the Authentication Decision function 312, Authentication Decision function 312 may route authentication requests received at AMF 112 based on the set conditions and current network conditions (e.g., whether the cloud 120 is accessible). At 348, UE 102 may send a registration/authentication request to AMF 112. The request is intercepted at the AMF 112/private 5G edge and forwarded to the cloud 120 or the enterprise 130 based on the conditions set at the Authentication Decision function 312. For example, at 350, the request may be transmitted to AUSF 122 if the cloud 120 is accessible and the default authentication method is SIM-based or certificate-based and cloud-hosted.

As another example, at 352, the authentication request may be transmitted to enterprise 130 when the default authentication method is enterprise-hosted (and certificate-based). In some embodiments, the UE 102 may be forced to re-attach to the network to redirect to certificate-based enterprise-hosted authentication. The authentication request may additionally be transmitted to enterprise 130 when the default authentication is cloud-hosted (e.g., SIM-based or certificate-based), the cloud is inaccessible, and the authentication policy indicates that authentication is to be controlled by the authentication service at enterprise 130 for the duration of cloud-hosted authentication inaccessibility.

Figure 4:
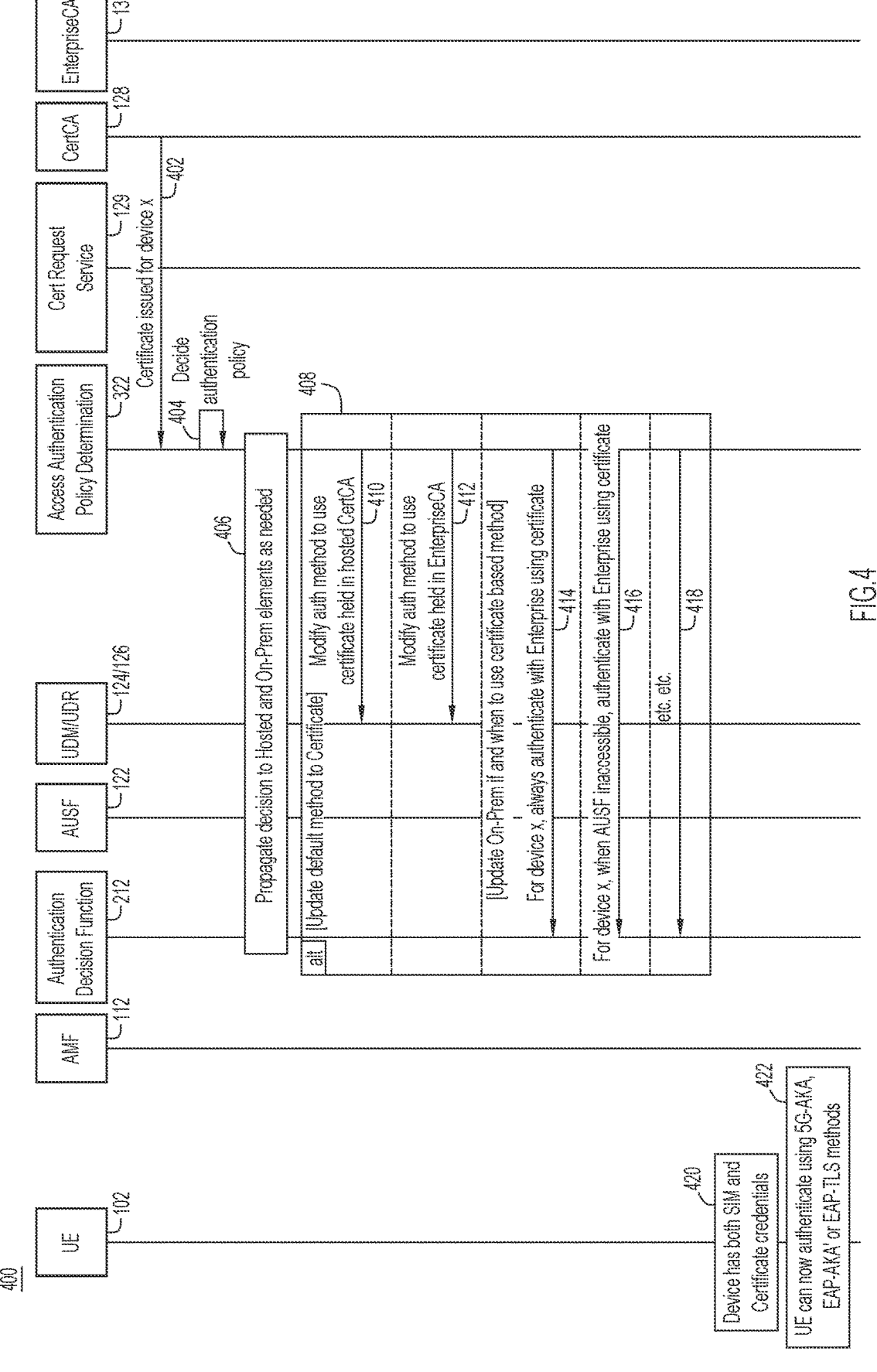
FIG. 4 is a message sequence diagram illustrating call flows associated with updating authentication techniques based on obtaining an enterprise certificate for a user device, according to an example embodiment.

Reference is now made to FIG. 4. FIG. 4 is a message sequence diagram illustrating a call flow 400 associated with updating authentication methods and routing authentication requests based on an authentication policy following a certificate delivery, according to an example embodiment.

In the example illustrated in FIG. 4, an enterprise certificate has been issued for UE 102 and stored at UE 102 using methods described above with respect to FIGS. 1 and 2. At 402. Cert CA 128 transmits a message to Access Authentication Policy Determination function 322 indicating that the certificate has been issued for UE 102. At 404, Access Authentication Policy Determination function 322 determines an authentication policy to apply to subsequent authentication requests received from UE 102. Examples of conditions of the authentication policy have been discussed with respect to FIG. 3. At 406, Access Authentication Policy Determination function 322 propagates the authentication policy to hosted elements in cloud 120 and elements in on-prem 110, as needed. Box 408 illustrates different updates that may be transmitted to network elements based on the authentication policy determined by Access Authentication Policy Determination function 322.

As illustrated in box 408, if the authentication policy indicates that the default method for performing subsequent authentication of UE 102 is using a certificate that is held at Cert CA 128 at the cloud 120, then, at 410, Access Authentication Policy Determination function 322 transmits a message to UDM 124/UDR 126 in the cloud 120 with an indication to modify the authentication method to use the certificate held in Cert CA 128. If the authentication policy indicates that the default method for performing subsequent authentication of UE 102 is using a certificate that is held at enterprise 130 at the cloud 120, then, at 412, Access Authentication Policy Determination function 322 transmits a message to UDM 124/UDR 126 in the cloud 120 with an indication to modify the authentication method to use the certificate held at enterprise 130.

The Access Authentication Policy Determination function 322 additionally updates the on-prem 110 with conditions indicating if and when to use certificate-based authentication for authenticating UE 102. For example, at 414, Access Authentication Policy Determination function 322 may transmit a message to Authentication Decision function 212 indicating that the authentication policy indicates that the default method of authentication for UE 102 is to authenticate with enterprise 130 using a certificate. As another example, at 416, Access Authentication Policy Determination function 322 may transmit a message to Authentication Decision function 212 indicating that the UE 102 is to authenticate with enterprise 130 using a certificate when AUSF 122 is inaccessible (e.g., when cloud 120 cannot be reached). At 418, Access Authentication Policy Determination function 322 may transmit other authentication policies to authentication decision function 212, such as authentication methods based on time of day, network resources, etc.

As illustrated at 420, UE 102 has both SIM and certificate credentials and, as illustrated at 422, UE 102 may authenticate with the private cellular 5GaaS network using either the SIM or certificate credentials based on the authentication policy. For example, UE 102 may authenticate with the 5GaaS network using 5G Authentication and Key Agreement (AKA) authentication, EAP AKA authentication, EAP-Transport Layer Security (TLS) authentication, or other methods of authentication using SIM or certificate credentials.

In one embodiment, when AUSF 122 communicates with enterprise 130, subsequent certificate-based authentication of UE 102 will follow standard 3GPP procedures. In this embodiment, UE 102 sends a registration to AMF 112 indicating that authentication is certificate-based using an EAP method. AMF 112 transmits the registration to AUSF 122 and AUSF 122 requests authentication vectors from UDM 124. UDM 124 consults UDR 126 and responds to AUSF 122 that the primary authentication is Authentication, Authorization, and Accounting (AAA) authentication in the enterprise 130. AUSF 122 communicates with an enterprise AAA server for authentication of UE 102. In another embodiment, Authentication Decision function 312 at AMF 112 determines that certificate-based authentication is to be used and that the authentication is enterprise-hosted. In this embodiment, AMF 112 may facilitate an Extensible Authentication Protocol (EAP) exchange directly with enterprise 130 to authenticate UE 102.

Referring to FIG. 5, FIG. 5 is a flow chart depicting a method 500 according to an example embodiment. In particular, method 500 illustrates example operations that may be performed to obtain an enterprise owned certificate for a user device based on a SIM-based authentication of the user device, as discussed for various techniques presented herein. Method 500 may be performed by one or more of, for example, UE 102, AMF 112, AUSF 122, UDM 124, UDR 126, Cert CA 128, Certificate Request Service 129, UPF 114, enterprise 130, Access Authentication Policy Determination function 322, and Authentication Decision function 312.

At 510, the method 500 may include receiving a request for a SIM-based authentication from a user device accessing a private cellular network. For example, an authentication request for accessing a private cellular network, such as a 5GaaS network, may be received at one or more cloud-hosted functions from UE 102.

At 520, the method 500 includes obtaining, from an enterprise, a certificate based on the SIM-based authentication of the user device, wherein the certificate is stored at the user device. For example, a cloud-hosted function, such as Cert CA 128, may request that enterprise 130 issue a certificate for UE 102. Cert CA 128 may obtain the certificate from enterprise 130 and issue the certificate to UE 102 on behalf of the enterprise 130. UE 102 may store the certificate.

At 530, the method 500 includes using the certificate for subsequent authentication of the user device when accessing the private cellular network. For example, UE 102 may use the certificate for subsequent certificate-based authentication with the private cellular network. The certificate may be used for the subsequent authentication based on an authentication policy that outlines when the certificate is to be used for authentication of UE 102. The authentication policy may additionally outline where the certificate is stored (e.g., at the cloud 120 or the enterprise 130) and/or which entity performs the authentication (e.g., cloud-hosted or enterprise-hosted).

Figure 6:
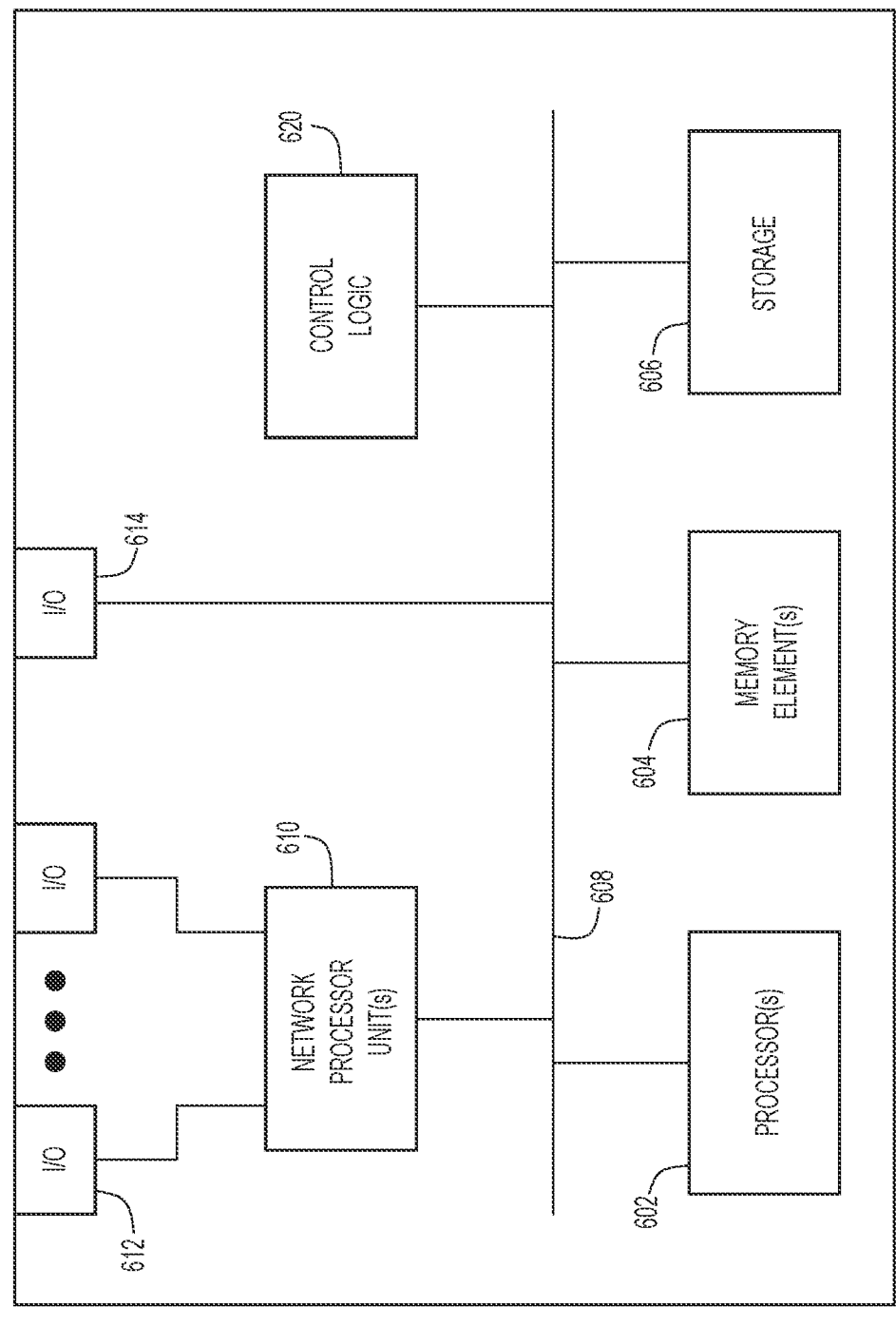
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with delaying processing of an error indication as discussed herein in connection with the techniques described herein. In various embodiments, a computing device, such as computing device 600 or any combination of computing devices 600, may be configured as any of an AMF, AUSF, UDM, UDR, Cert CA, Certificate Request Service, UPF 114. Access Authentication Policy Determination function 322, Authentication Decision function 312, etc. as discussed for the techniques discussed herein.

It should be appreciated that FIG. 6 provides only an illustration of one embodiment and does not imply any limitations with regard to the environments in which different embodiments may be implemented. Many modifications to the depicted environment may be made.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 7:
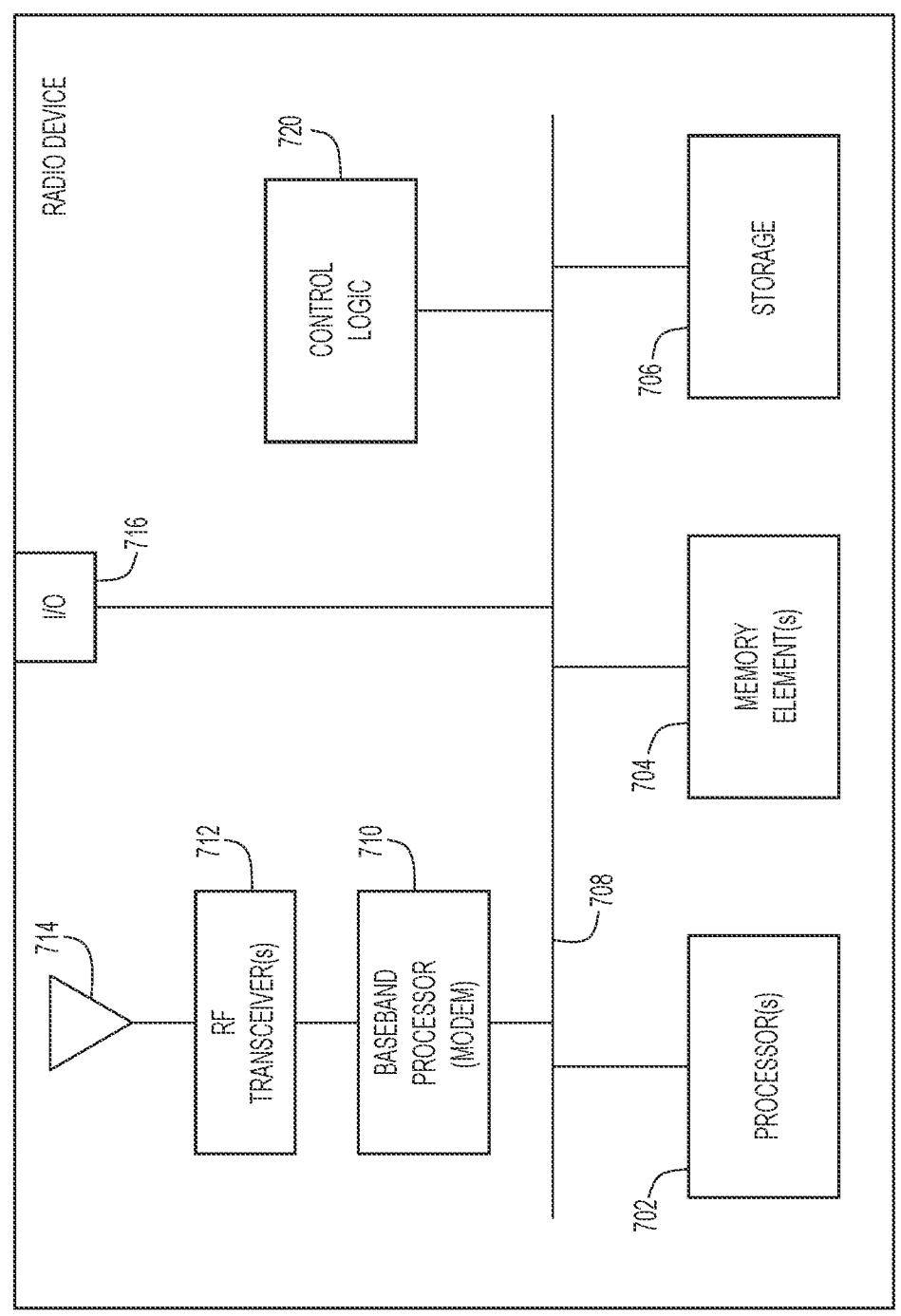
FIG. 7 is a hardware block diagram of a radio device that may perform functions associated with any combination of operations, in connection with the techniques discussed herein.

Referring to FIG. 7, FIG. 7 illustrates a hardware block diagram of a radio device 700 that may perform functions associated with operations discussed herein. In various embodiments, a user equipment or apparatus, such as radio device 700 or any combination of radio device 700, may be configured as any radio node/nodes as depicted herein in order to perform operations of the various techniques discussed herein, such as operations that may be performed by any of a user device, such as UE 102.

In at least one embodiment, radio device 700 may be any apparatus that may include one or more processor(s) 702, one or more memory element(s) 704, storage 706, a bus 708, a baseband processor or modem 710, one or more radio RF transceiver(s) 712, one or more antennas or antenna arrays 714, one or more I/O interface(s) 716, and control logic 720.

The one or more processor(s) 702, one or more memory element(s) 704, storage 706, bus 708, and I/O interface(s) 716 may be configured/implemented in any manner described herein, such as described herein at least with reference to FIG. 6.

The RF transceiver(s) 712 may perform RF transmission and RF reception of wireless signals via antenna(s)/antenna array(s) 714, and the baseband processor (modem) 710 performs baseband modulation and demodulation, etc. associated with such signals to enable wireless communications for radio device 700.

In various embodiments, control logic 720, can include instructions that, when executed, cause processor(s) 702 to perform operations, which can include, but not be limited to, providing overall control operations of radio device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620/720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604/704 and/or storage 606/706 can store data, software, code, instructions (e.g., processor instructions), logic, parameters, combinations thereof, and/or the like used for operations described herein. This includes memory element(s) 604/704 and/or storage 606/706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided that includes receiving a request for a Subscriber Identity Module (SIM)-based authentication from a user device accessing a private cellular network; obtaining, from an enterprise, a certificate based on the SIM-based authentication of the user device, wherein the certificate is stored at the user device; and using the certificate for subsequent authentication of the user device when accessing the private cellular network.

In one example, the private cellular network is a private Third (3rd) Generation Partnership Project (3GPP) Fifth Generation (5G) as-a-Service (5GaaS) network. In another example, the method further comprises transmitting, based on the certificate being obtained, an authentication policy to one or more functions, the authentication policy indicating when the certificate is to be used for authentication of the user device with the private cellular network. In another example, the authentication policy indicates that the certificate is to be used for authentication of the user device with the private cellular network when SIM-based authentication is not possible.

In another example, the authentication policy indicates that the certificate is to be used for authentication of the user device with the private cellular network even when SIM-based authentication is possible, that the certificate is stored at a cloud of the private cellular network, and the authentication is cloud-hosted. In another example, wherein the authentication policy indicates that the certificate is to be used for authentication of the user device with the private cellular network even when SIM-based authentication is possible, that the certificate is stored at the enterprise, and the authentication is enterprise-hosted. In another example, a function of the one or more functions is located at an on-premise portion of the private cellular network, and wherein an Access and Mobility Function (AMF) at the on-premise portion intercepts subsequent authentication requests and routes the subsequent authentication requests to the enterprise or to a cloud of the private cellular network based on the authentication policy stored at the function.

In another form, a system is provided including: one or more memories for storing data; one or more network interfaces configured to enable network communications; and one or more processors for executing instructions associated with the data, wherein executing the instructions causes the system to perform operations, including: receiving a request for a Subscriber Identity Module (SIM)-based authentication from a user device accessing a private cellular network; obtaining, from an enterprise, a certificate based on the SIM-based authentication of the user device, wherein the certificate is stored at the user device; and using the certificate for subsequent authentication of the user device when accessing the private cellular network.

In another form, one or more non-transitory computer-readable storage media encoded with instructions are provided that, when executed by one or more processors, cause the one or more processors to perform operations, including: receiving a request for a Subscriber Identity Module (SIM)-based authentication from a user device accessing a private cellular network; obtaining, from an enterprise, a certificate based on the SIM-based authentication of the user device, wherein the certificate is stored at the user device; and using the certificate for subsequent authentication of the user device when accessing the private cellular network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

receiving a request for a Subscriber Identity Module (SIM)-based authentication from a user device accessing a private cellular network;

15 obtaining, from an enterprise, a certificate based on the SIM-based authentication of the user device, wherein the certificate is stored at the user device;

transmitting, by a first function of the private cellular network and based on the certificate being obtained, an authentication policy to one or more second functions of the private cellular network, the authentication policy indicating conditions under which the certificate is to be used for authentication of the user device with the private cellular network, the conditions including time of day conditions or network resource conditions under which the certificate is to be used for authentication; and using the certificate for subsequent authentication of the user device when accessing the private cellular network.

2. The method of claim 1, wherein the private cellular network is a private Third (3$^{rd}$) Generation Partnership Project (3GPP) Fifth Generation (5G) as-a-Service (5GaaS) network.

3. The method of claim 1, wherein the authentication policy indicates that the certificate is to be used for authentication of the user device with the private cellular network when SIM-based authentication is not possible.

4. The method of claim 1, wherein the authentication policy indicates that the certificate is to be used for authentication of the user device with the private cellular network even when SIM-based authentication is possible, that the certificate is stored at a cloud of the private cellular network, and the authentication is cloud-hosted.

5. The method of claim 1, wherein the authentication policy indicates that the certificate is to be used for authentication of the user device with the private cellular network even when SIM-based authentication is possible, that the certificate is stored at the enterprise, and the authentication is enterprise-hosted.

6. The method of claim 1, wherein a second function of the one or more second functions is located at an on-premise portion of the private cellular network, and wherein an Access and Mobility Function (AMF) at the on-premise portion intercepts subsequent authentication requests and routes the subsequent authentication requests to the enterprise or to a cloud of the private cellular network based on the authentication policy stored at the second function.

7. A system comprising:

one or more memories for storing data;

one or more network interfaces configured to enable network communications; and one or more processors for executing instructions associated with the data, wherein executing the instructions causes the system to perform operations, comprising:

receiving a request for a Subscriber Identity Module (SIM)-based authentication from a user device accessing a private cellular network;

obtaining, from an enterprise, a certificate based on the SIM-based authentication of the user device, wherein the certificate is stored at the user device;

transmitting, based on the certificate being obtained, an authentication policy to one or more functions of the private cellular network, the authentication policy indicating conditions under which the certificate is to be used for authentication of the user device with the private cellular network, the conditions including time of day conditions or network resource conditions under which the certificate is to be used for authentication; and

using the certificate for subsequent authentication of the user device when accessing the private cellular network.

8. The system of claim 7, wherein the private cellular network is a private Third (3$^{rd}$) Generation Partnership Project (3GPP) Fifth Generation (5G) as-a-Service (5GaaS) network.

9. The system of claim 7, wherein the authentication policy indicates that the certificate is to be used for authentication of the user device with the private cellular network when SIM-based authentication is not possible.

10. The system of claim 7, wherein the authentication policy indicates that the certificate is to be used for authentication of the user device with the private cellular network even when SIM-based authentication is possible, that the certificate is stored at a cloud of the private cellular network, and the authentication is cloud-hosted.

11. The system of claim 7, wherein the authentication policy indicates that the certificate is to be used for authentication of the user device with the private cellular network even when SIM-based authentication is possible, that the certificate is stored at the enterprise, and the authentication is enterprise-hosted.

12. The system of claim 7, wherein a function of the one or more functions is located at an on-premise portion of the private cellular network, and wherein an Access and Mobility Function (AMF) at the on-premise portion intercepts subsequent authentication requests and routes the subsequent authentication requests to the enterprise or to a cloud of the private cellular network based on the authentication policy stored at the function.

13. One or more non-transitory computer-readable storage media encoded with instructions that, when executed by one or more processors, cause the one or more processors to perform operations, comprising:

receiving a request for a Subscriber Identity Module (SIM)-based authentication from a user device accessing a private cellular network;

obtaining, from an enterprise, a certificate based on the SIM-based authentication of the user device, wherein the certificate is stored at the user device;

transmitting, based on the certificate being obtained, an authentication policy to one or more functions of the private cellular network, the authentication policy indicating conditions under which the certificate is to be used for authentication of the user device with the private cellular network, the conditions including time of day conditions or network resource conditions under which the certificate is to be used for authentication; and using the certificate for subsequent authentication of the user device when accessing the private cellular network.

14. The one or more non-transitory computer-readable storage media of claim 13, wherein the private cellular network is a private Third (3rd) Generation Partnership Project (3GPP) Fifth Generation (5G) as-a-Service (5GaaS) network.

15. The one or more non-transitory computer-readable storage media of claim 13, wherein the authentication policy indicates that the certificate is to be used for authentication of the user device with the private cellular network when SIM-based authentication is not possible.

16. The one or more non-transitory computer-readable storage media of claim 13, wherein the authentication policy indicates that the certificate is to be used for authentication of the user device with the private cellular network even when SIM-based authentication is possible, that the certificate is stored at a cloud of the private cellular network, and the authentication is cloud-hosted.

17. The one or more non-transitory computer-readable storage media of claim 13, wherein the authentication policy indicates that the certificate is to be used for authentication of the user device with the private cellular network even when SIM-based authentication is possible, that the certificate is stored at the enterprise, and the authentication is enterprise-hosted.

18. The method of claim 1, wherein the authentication policy further indicates whether the authentication is enterprise-hosted or cloud-hosted and/or where the certificate is stored.

19. The system of claim 7, wherein the authentication policy further indicates whether the authentication is enterprise-hosted or cloud-hosted and/or where the certificate is stored.

20. The one or more non-transitory computer-readable storage media of claim 13, wherein the authentication policy further indicates whether the authentication is enterprise-hosted or cloud-hosted and/or where the certificate is stored.

* * * * *